Patented Apr. 15, 1947

2,418,986

UNITED STATES PATENT OFFICE 2,418,986

GERMICIDAL SOLUTIONS OF PHENYL MERCURY COMPOUNDS

Guy Rampel, New York, N. Y.

No Drawing. Application December 29, 1943,
Serial No. 516,118

1 Claim. (Cl. 167—19)

My invention relates to compositions of matter having germicidal, bactericidal and fungicidal properties and refers particularly to compositions of matter of the character mentioned containing mercury compounds and diethylene-glycol-monoethylether.

I have found that compositions of matter containing certain mercury compounds, such as phenyl mercury hydroxide or phenyl mercury acetate, and diethylene-glycol-monoethylether possess valuable germicidal, bactericidal and fungicidal properties coupled with other properties, which are suitable for many applications where such properties are desirable.

The compositions of my invention are much more soluble in water than the mercury compounds employed, thus allowing the production of much stronger solutions, if desired, and thus possessing a greater scope of varying strengths adaptable for specific purposes.

My compositions also allow the addition of organic acids, greatly reduces the toxicity of the mercury compound employed.

Another valuable property of my compositions is their penetrating ability, thus allowing them to be employed where it is desired to have subsurface application of the composition.

Another property of my compositions is their strong attachment to textile fabrics, thus allowing repeated washing with water and dry cleaning operations before its complete elimination from textiles.

Another property of my compositions is its adaptability to incorporate in unguents for application for toilet and medicinal purposes.

The above mentioned, and other valuable properties of the compositions of matter of my invention will be evident and appreciated by their application for numerous purposes where a germicide, bactericide and fungicide is desirable.

I have found that if a phenyl mercury compound and diethylene-glycol-monoethylether be dissolved in an organic solvent in a practically neutral condition, there results a solution of a composition of matter having the above-mentioned valuable properties.

Another valuable property of my compositions of matter is their unexpected stability in relatively highly aqueous solutions, thus preventing the formation of precipitants upon standing for considerable lengths of time, a property that results in increased penetrating and spreading properties.

From the mercury compounds suitable for the production of the matters of my invention, I prefer to use phenyl mercury acetate and phenyl mercury hydroxide, and from the organic solvents suitable for the production of the matters of my invention I prefer to use diethylene-glycol-monoethylether.

I give the following as examples of the production of compositions of matter of my invention.

Example 1

Three grams phenyl-mercury acetate, 50 cc. diethylene-glycol-monoethylether, 0.7 cc. lactic acid and 48.5 cc. water are added together and allowed to stand for several hours and 0.8 cc. ammonia is added thereto. The clear solution thus formed has a pH of about 6.5 to 6.8 and a phenol coefficient of about 16.

Example 2

This example contains the same proportion of ingredients as given in Example 1, except that the phenyl-mercury acetate of that example is substituted by an equal quantity of phenyl-mercury hydroxide.

Example 3

This example contains the same ingredients as given in Example 1 except that the water of that example is omitted.

Example 4

This example contains the same ingredients as given in Example 2 except that the water of that example is omitted.

All of the above mentioned compositions of matter possess germicidal, bactericidal and fungicidal properties are remarkably stable in the presence of water and possess the valuable property of being much less toxic when applied to the skin than are the particular mercury compounds employed in their production.

They are particularly valuable in the treatment of textile fiber and fabrics, destroying bacterial deposits, thus preventing the tendering of the fibers due to such bacterial activities, removing this cause of uneven dyeings and presenting and preserving them in hygienic condition.

In employment of these compositions of textile fibers and fabrics, I prefer to add a suitable amount, usually about 0.1 per cent of an organic detergent to assist in the penetration of the compositions.

The pH of my compositions may vary with the specific uses to which they are applied, thus while a pH of 6.5 to 6.8 is suitable for general purposes, they must be alkaline when employed with casein in which case their alkalinity may be as great as 9.0 to 10.0; while when employed with organic water-repellent they must be acid.

These various degrees of alkalinity and acidity can be readily attained by adding ammonia or lactic, or other organic acid to the given examples.

My compositions of matter have many valuable applications where properties such as they possess are desired, among which are treatments of leather, rubber, glues and cosmetics.

I do not limit myself to the chemicals, amounts, pH degrees, alkalinities or acidities particularly mentioned, as these are given solely for the purpose of clearly describing my invention.

What I claim is:

A composition of matter containing approximately the following proportions of ingredients: 3 parts by weight phenyl mercury acetate, 50 parts by volume diethylene-glycol-monoethyl-ether, 0.7 part by volume lactic acid, 0.8 part by volume ammonia and sufficient water to produce the desired dilution of the composition.

GUY RAMPEL.

REFERENCES CITED

The following references are of record in the file of this patent:

UNITED STATES PATENTS

| Number | Name | Date |
| --- | --- | --- |
| 2,067,674 | Kimerlin | Jan. 12, 1937 |
| 2,044,959 | Tisdale | June 23, 1930 |